(12) United States Patent
Renaud

(10) Patent No.: US 7,147,007 B2
(45) Date of Patent: Dec. 12, 2006

(54) VARIABLE STIFFNESS BELLOWS

(75) Inventor: Michel C. Renaud, Prangins (CH)

(73) Assignee: E. I. du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 11/441,299

(22) Filed: May 25, 2006

(65) Prior Publication Data

US 2006/0254663 A1 Nov. 16, 2006

Related U.S. Application Data

(63) Continuation of application No. 09/681,934, filed on Jun. 28, 2001, now abandoned.

(60) Provisional application No. 60/215,587, filed on Jun. 30, 2000.

(51) Int. Cl.
*F16L 11/11* (2006.01)
(52) U.S. Cl. .............................. 138/121; 138/DIG. 11; 138/119; 138/122
(58) Field of Classification Search ................ 138/121, 138/122, 119, DIG. 11
See application file for complete search history.

(56) References Cited

U.S. PATENT DOCUMENTS

| | | | | |
|---|---|---|---|---|
| 2,143,960 A | * | 1/1939 | Stalter et al. ............... | 138/110 |
| 3,578,777 A | * | 5/1971 | DeGain ....................... | 138/121 |
| 3,605,817 A | * | 9/1971 | Bauman et al. ............. | 138/121 |
| 3,715,454 A | * | 2/1973 | Kleykamp .................... | 174/47 |
| 3,855,799 A | * | 12/1974 | Martin et al. ................. | 405/49 |
| 5,439,035 A | * | 8/1995 | Dal Palu e, acu uAttilio ............ | 138/121 |
| 5,564,472 A | * | 10/1996 | Gipperich .................... | 138/121 |
| 5,706,864 A | * | 1/1998 | Pfleger ........................ | 138/121 |
| 5,792,532 A | * | 8/1998 | Pfleger ....................... | 428/36.9 |
| 6,021,816 A | * | 2/2000 | Jeltsch et al. ............... | 138/121 |
| 6,056,018 A | * | 5/2000 | Renaud ....................... | 138/121 |
| 6,079,451 A | * | 6/2000 | Hegler ........................ | 138/121 |
| 6,123,113 A | * | 9/2000 | Pontbriand et al. ......... | 138/121 |

FOREIGN PATENT DOCUMENTS

| | | |
|---|---|---|
| EP | 863 351 | 4/2001 |
| WO | WO99/22171 | 5/1999 |

\* cited by examiner

*Primary Examiner*—James Hook

(57) ABSTRACT

This invention relates to a flexible tube that includes a bellows having a plurality of convolutes formed in the wall of said tube and extending above the top surface of the tube, said convolutes being spaced from one another in the axial direction of the tube, wherein at least one of said convolutes comprises two opposing bending sections and two restrained elongation sections positioned between the bending sections, and wherein the height of the bending sections above the top surface of the tube is greater that the height of the restrained elongation sections above the top surface of the tube.

10 Claims, 12 Drawing Sheets

VARIABLE STIFFNESS BELLOWS

CROSS REFERENCE TO RELATED APPLICATIONS

This application is a continuation of application Ser. No. 09/681,934, filed Jun. 28, 2001, now abandoned, which claims the benefit of priority to U.S. Provisional Application No. 60/215,587, Jun. 30, 2000.

BACKGROUND

1. Field of the Invention

This invention relates to the field of flexible tubes that may be used as air ducts, coolant pipes, fuel tubes, filler necks and the like, such as are used in the automotive industry.

2. Description of the Related Art

Flexible tubes are used, for example, as air ducts in automobiles where the air duct carries air to an engine. The air may pass through a turbocharger, in which case the air flowing through the duct is heated to temperatures of generally 140–160C, but possibly up to 180–200C.

These air ducts are often made by various blow molding techniques. Sequential extrusion blow molding technology is used to produce one-piece air ducts that combine several hard and soft segments.

The internal surfaces of the air duct exposed to the air pressure are under stress. Further, such exposed surfaces create an axial force that causes a longitudinal tension on the air duct because of end-cap effects. As the bellows of the air duct are more flexible than the tube, the bellows tends to elongate more in the longitudinal direction, which is the so-called "pneumatic piston effect". Expansion of the bellows in the radial direction, called "ballooning", is relatively low in absolute value compared to the longitudinal elongation of the bellows.

Tensile and shear forces also create constant stress on the air duct which leads to creep of material of the air duct, causing the air duct to elongate over time. This elongation changes the bending stiffness of the air duct, which is why the design of a particular air duct bellows is a case-by-case compromise of various design criteria.

An example of a flexible tube that may be used an air duct is shown FIGS. 1A–1C, where there is shown a flexible tube 11 that includes a bellows 13 having a plurality of convolutes 15 formed in tube 11. Convolutes 15 are, essentially, raised circumferential ridges formed in the surface of tube 11.

When fluids, such as air or liquids, move under pressure through a tube, the pressure in contact with the projected axial surface of tube 11 caused by the end-cap effects creates a force which pulls and deforms bellows 13. This force generates material stress which leads to material creep over time, and which can make tube 11 fall out of its design tolerance. Tube 11 may then move undesirably and contact other parts which may damage tube 11 or the parts it contacts. When used in an engine, the duct may contact hot surfaces or sharp angles and be damaged.

The bellows 15 of flexible tube 11 provides the same bending stiffness along the Y and Z axes. There is no additional design feature that serves to reduce or control the longitudinal deformation, that is, the deformation along the X axis, when flexible tube 11 is subject to elevated temperature and pressure due to the compressed air circulating therein.

One way to overcome the problem of deformation of tube 11 along the X axis is to add two parallel longitudinal ribs to bellows 13 of flexible tube 11. Turning now to FIGS. 2A–2B, there is shown a flexible tube 21 that includes a bellows 23 having a plurality of convolutes 25 formed in tube 21. A pair of opposing longitudinal ribs 27 is formed along bellows 23 so as to connect convolutes 25 with one another. The width and height of ribs 27 may be varied. If rib 27 is wider or higher than convolutes 25, flexible tube 21 will have a greater tensile strength along the X axis but tube 21 will have a weaker burst resistance because rib 27 will tend to unfold or open when subject to high pressure.

Flexible tube 21 provides bending capability along the Z axis, but reduced bending along the Y axis and reduced elongation along the X axis. The design of FIGS. 2A–2B suffers from the problem that it is difficult to design tube 21 to get the right compromise of pressure resistance, stiffness and bending properties.

Another way to reduce the longitudinal deformation of a flexible tube is shown in FIGS. 3A–3C where there is shown a flexible tube 31 that includes a bellows 33 having a plurality of convolutes 35 formed in tube 31. Opposing sides of convolutes 35 have a flattened portion 37 where the outer surface of convolutes 35 is equal to the outer surface of tube 31. This type of flexible tube is the subject of pending patent applications WO 99/22171 and EP 0 863 351 A2.

Flexible tube 31 provides bending capability along the Z axis, but reduced bending along the Y axis and reduced elongation along the X axis. Further, bellows 33 allows tube 31 to be decoupled, that is, it allows tube 31 to move independently of other parts of an engine. Decoupling prevents or greatly reduces the shear stress on the end portions of tube 31.

However, tube 31 suffers from the problems that it is difficult to adjust in terms of pressure resistance, bending stiffness and that the bending stiffness in the Z axis is too high due to limitations in the design and the method of manufacturing such flexible tubes 31.

Flexible tubes such as those discussed above are made by a blow molding process wherein an extruded parison, or extruded tube, of a polymer material is placed in a tool cavity. Turning to FIG. 4A, there is shown a tool 41 having a cavity 43 for making a flexible tube 45. A parison 47 is placed in cavity 43, said parison 47 having a varying thickness so that parison 47 is thicker in the area nearer to the part of the cavity 43 that forms convolutes 48 of tube 45.

Air is blown into cavity 43 and as shown in FIG. 4B, once the blow molding process has been completed, tube 45 is in contact with tool 41, and, due to the internal pressure applied during the transformation, the entire surface of cavity 43 is covered with polymer. As a result of parison 47 being thicker in certain portions so as to accommodate convolutes 48, the wall thickness distribution of tube 45 is not uniform. In particular, a flattened portion 49 of convolute 48 is thicker than any other portion of flexible tube 45.

In general, profiles and shapes close to the initial parison tend to be somewhat thicker than remote ones. The ratio between the location of minimum material expansion, in this case the flattened portion 49 to the location of the maximum material expansion, the thickness of the outer edge of convolute 48, is called the blow ratio and depends on the material used in the blow molding process.

This variation in the wall thickness of flexible tube 31 has the following negative effects:

There is a decrease in the bending capability of tube 45 along the Z axis (shown for example in FIGS. 3A–3C) because the relatively thicker walls of flattened portions 49 are stiffer.

The extra material present in flattened portions 49 is not needed and does not reduce stress on the most exposed area of tube 45, namely the external surface of convolutes 48.

What is needed, therefore, is, a flexible tube having a bellows design that overcomes the problems associated with the bellows of the prior art.

SUMMARY OF THE INVENTION

The present invention is directed to a flexible tube having a bellows that includes a plurality of convolutes formed in the wall of said tube and extending above the top surface of the tube. The convolutes are spaced apart from one another in the axial direction of the tube, and at least one of the convolutes has two opposing bending sections and two restrained elongation sections positioned between the bending sections, where the height of the bending sections above the top surface of the tube is greater that the height of the restrained elongation sections above the top surface of the tube.

The tube is preferably made of a thermoplastic material.

The bending sections are preferably opposite each other at an angle of 150–210°, preferably 180° and, similarly, the restrained elongation sections are preferably opposite each other at an angle of 150–210°, preferably 180°.

DETAILED DESCRIPTION

The present invention is directed to a flexible tube having a bellows that includes a plurality of convolutes formed in the wall of said tube and extending above the top surface of the tube. The convolutes are spaced apart from one another in the axial direction of the tube, and at least one of the convolutes has two opposing bending sections and two restrained elongation sections positioned between the bending sections, where the height of the bending sections above the top surface of the tube is greater that the height of the restrained elongation sections above the top surface of the tube.

The bending sections are preferably opposite each other at an angle of 150–210°, preferably 180° and, similarly, the restrained elongation sections are preferably opposite each other at an angle of 150–210°, preferably 180°.

The inventive flexible tube maintains the benefits of flexible tube 31 discussed above, namely, a simple design and applicability to a wide range of profiles, while exhibiting improved bending and elongation characteristics. The convolutes in the tube of the invention are higher above the tube surface in the bending sections than in the restrained elongation sections, which design has the beneficial effects of providing:

- effective restriction of the elongation of the tube in the X axis;
- a bending ability in the Z axis is as good as or better than the bending ability of flexible tube 31;
- a more uniform wall thickness in the restrained elongation section of the bellows;
- a pre-defined or pre-set bending path in the restrained elongation sectors.
- a flexible tube design that may be made by blow molding; and
- a reduced bending capability along the Y axis.

There is no particular limitation on the material from which the tube of the invention is made provided that the tube is flexible. If blow molded, the flexible tube and bellows may be made from any blow-moldable thermoplastic resin. The term "thermoplastic resin" includes synthetic polyamides, polyesters, polyacetals, block polyester ether copolymers, ethylene propylene diene elastomer (EPDM), olefins such as polypropylene, as well as mixtures or blends thereof.

Figure 5A:
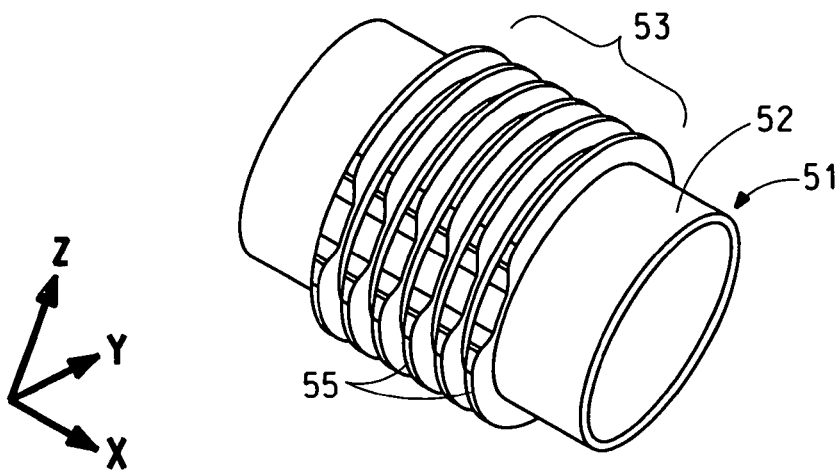
FIGS. 5A–5C are, respectively, a view in perspective, a front view in elevation and a side view in elevation of a flexible tube of the invention which includes a bellows having convolutes of varying heights.
Figure 5B:
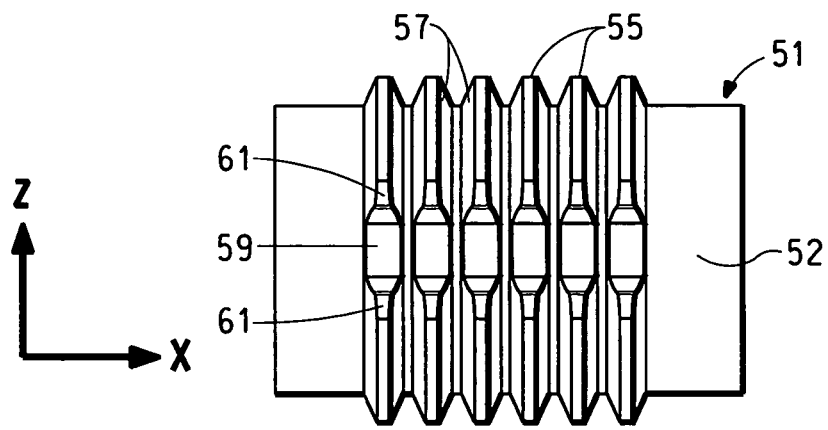
Figure 5C:
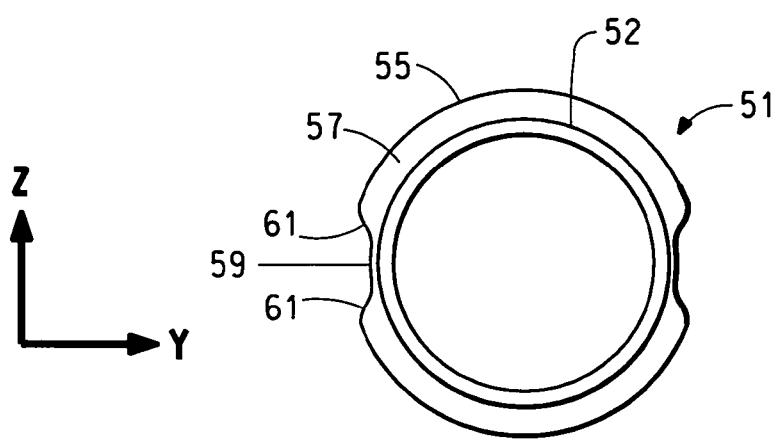

The invention is illustrated in FIGS. 5A–5C where there is shown a flexible tube 51 that includes a bellows 53 having a plurality of convolutes 55 formed therein spaced at an interval from each other in the axial direction of flexible tube 51. Convolutes 55, which are raised circumferential ridges formed in the surface of tube 51 as an integral part thereof, have bending sections 57, restrained elongation sections 59, and transition sections 61 that connect bending sections 57 to restrained elongation sections 59.

Bending sections 57 are preferably opposite each other at an angle of 150–210°, preferably 180°. Similarly, restrained elongation sections 59 are preferably opposite each other at an angle of 150–210°, preferably 180°.

Bending sections 57 are approximately the same height above the outer surface of tube 51, and likewise restrained elongation sections 59 are approximately the same height above the outer surface of tube 51 with bending sections 57 having a height above the outer surface of tube 51 greater than the height of restrained elongation sections 59 above the outer surface of tube 51.

Figure 1A:
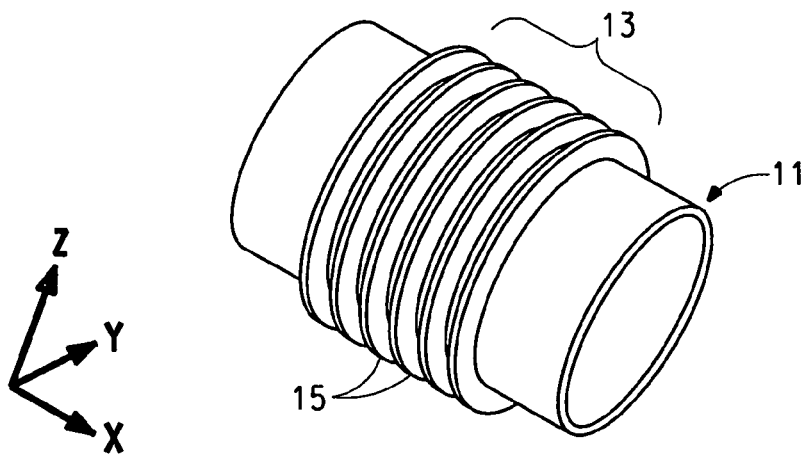
FIGS. 1A–1C are, respectively, a view in perspective, a front view in elevation and a side view in elevation of a prior art flexible tube having a conventional bellows.
Figure 1B:
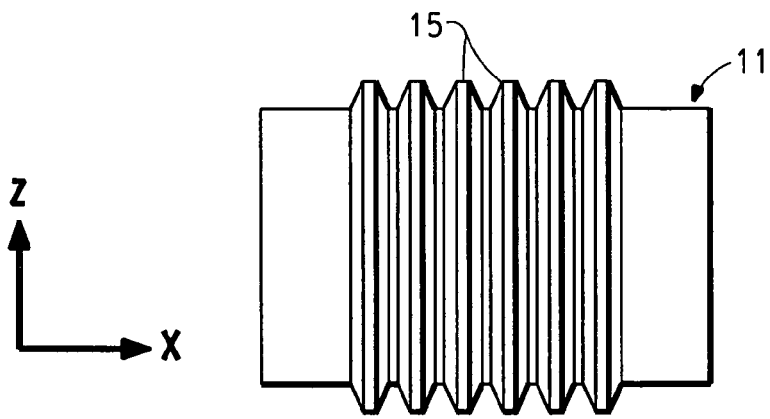
Figure 1C:
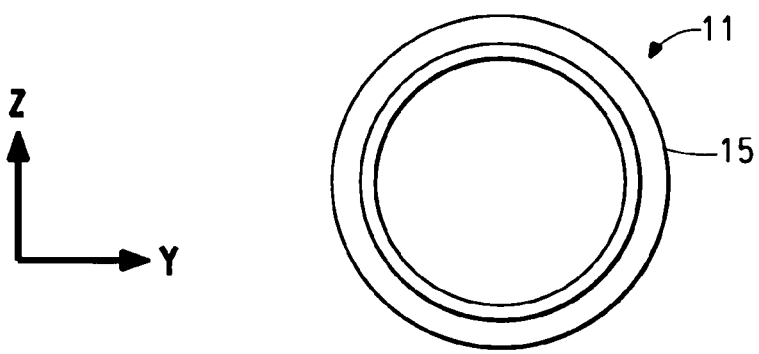
Figure 2A:
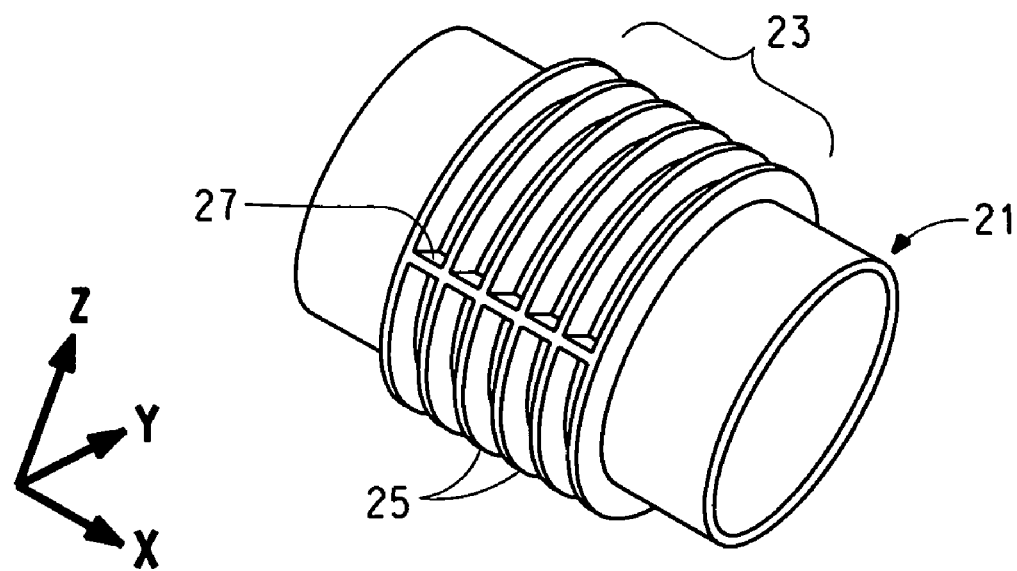
FIGS. 2A–2B are, respectively, a view in perspective and a front view in elevation of a prior art flexible tube having a conventional bellows design that includes a longitudinal rib formed along the convolutes of the bellows.
Figure 2B:
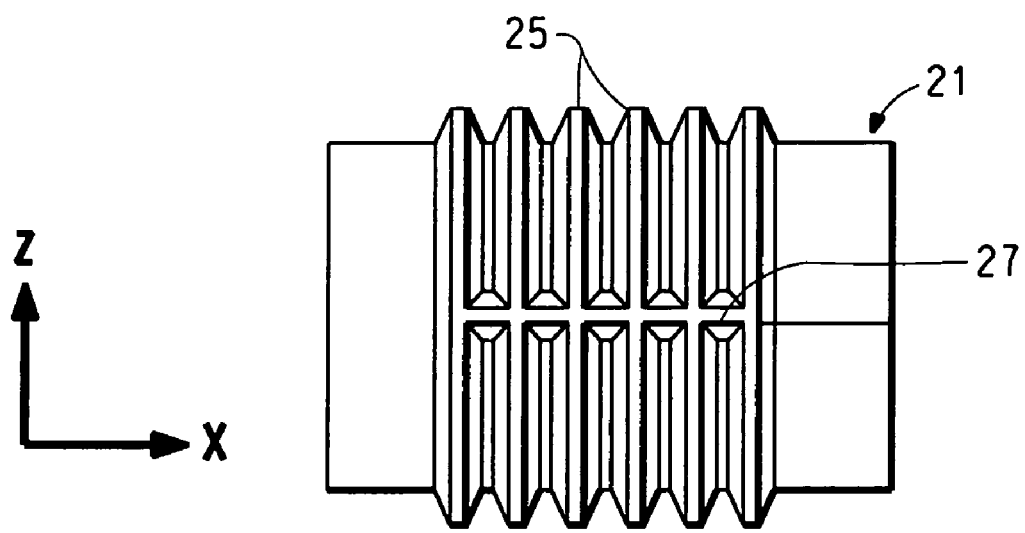
Figure 3A:
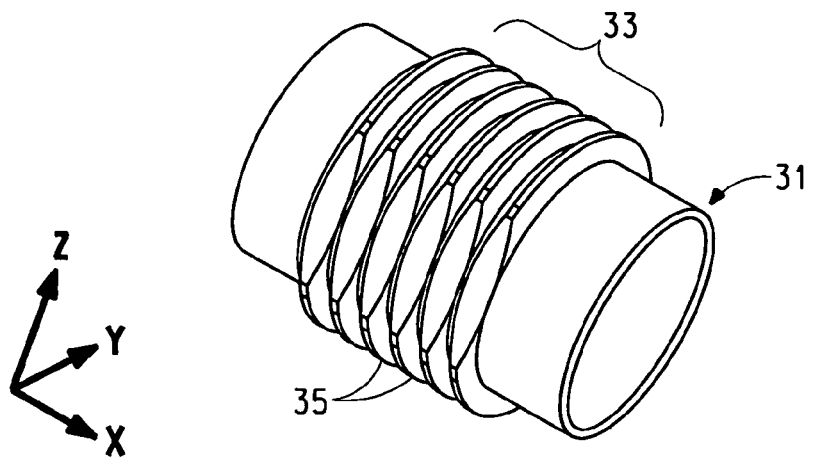
FIGS. 3A–3C are, respectively, a view in perspective, a front view in elevation and a side view in elevation of a prior art flexible tube having a bellows that includes flattened convolutes.
Figure 3B:
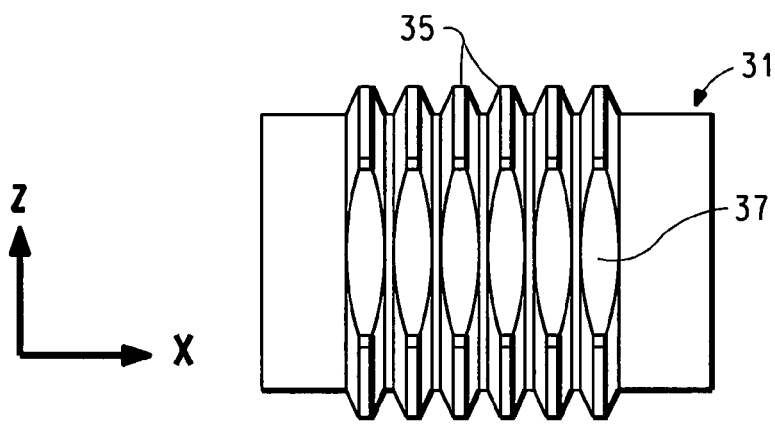
Figure 3C:
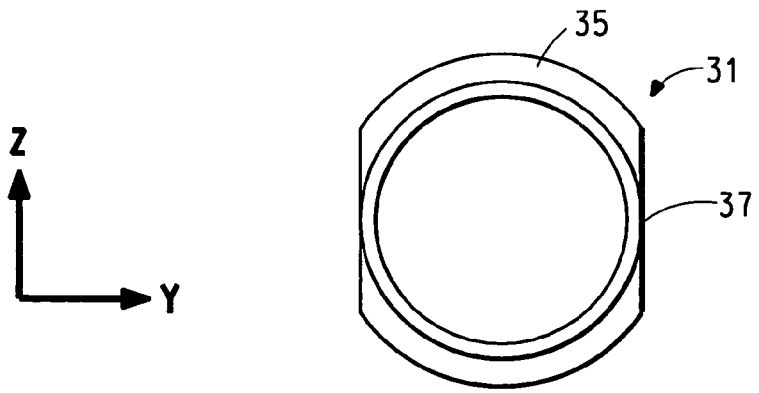
Figure 4A:
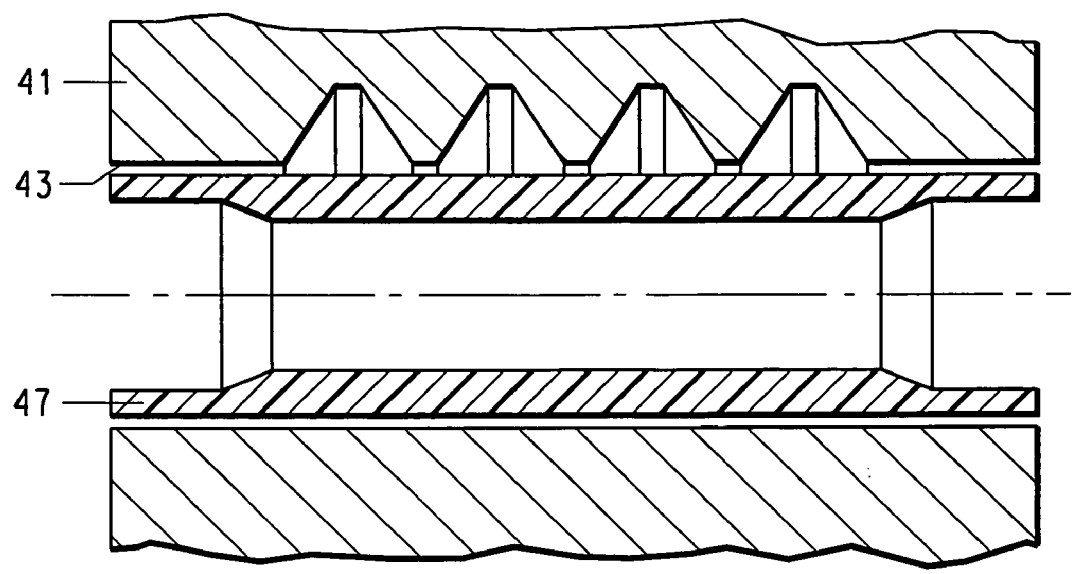
FIG. 4A is a cross sectional view of a tool cavity projected flat which shows a bending section and restrained elongation section for a prior art flexible tube, said tool having a polymer parison positioned therein before the flexible tube is blow molded
Figure 4B:
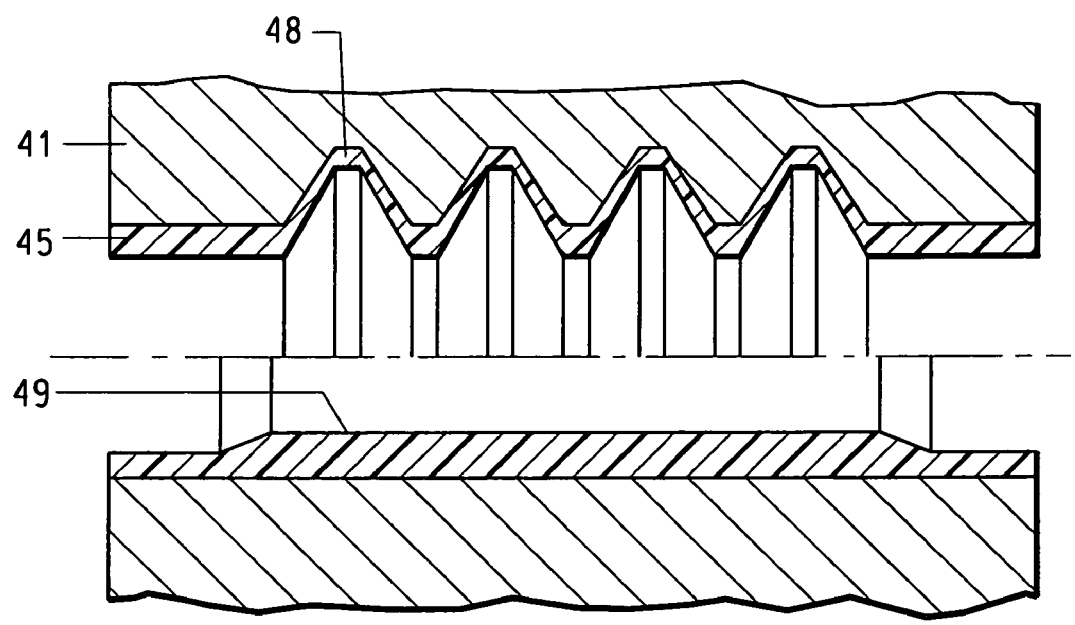
FIG. 4B is the same view as 4A except after the flexible tube has been blow molded.
Figure 6A:
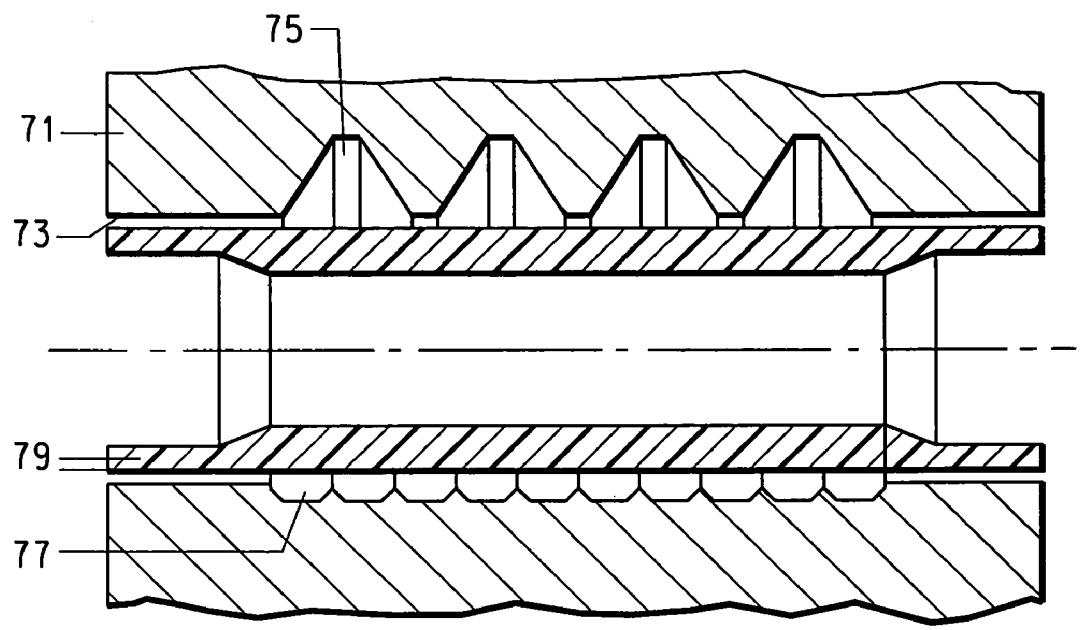
FIG. 6A is a cross sectional view of a tool cavity projected flat which shows a bending section and restrained elongation section for a flexible tube, said tool cavity having a polymer parison positioned therein before the flexible tube is blow molded
Figure 6B:
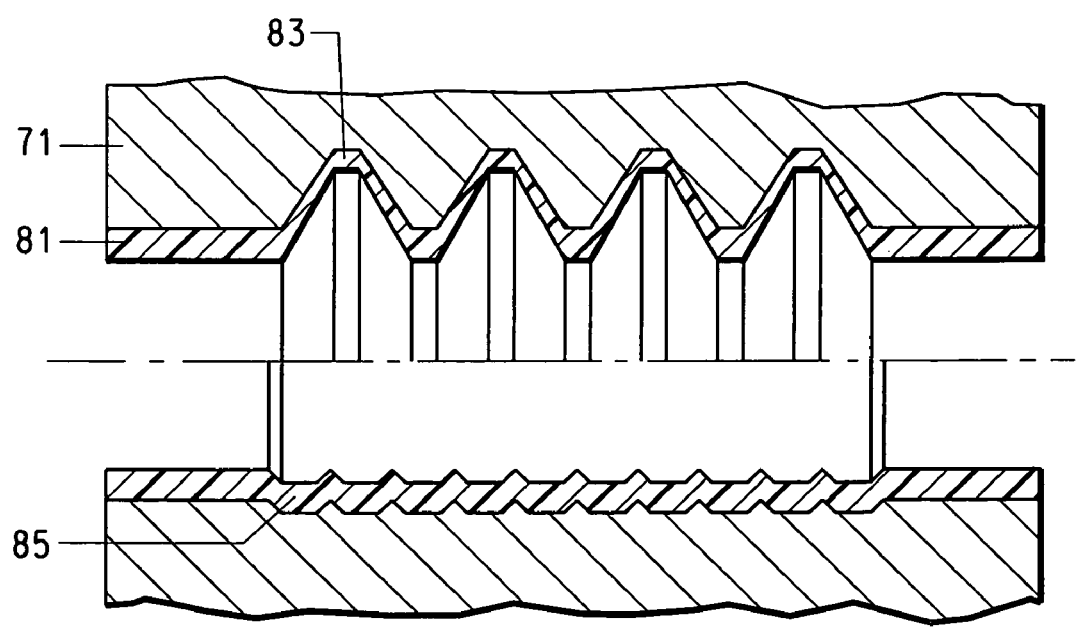
FIG. 6B is the same view as 6A except after the flexible tube has been blow molded.

Turning to FIGS. 6A–6B, there is shown a tool 71 having a cavity 73 that includes a bending section cavity 75 and restrained elongation section cavity 77. A parison 79 is placed in cavity 73, said parison 79 having a varying thickness. As is shown in FIG. 6B, after parison 79 has been blow molded, there is formed a flexible tube 81 having a bending section 83 and an restrained elongation section 85. The wall thickness distribution in flexible tube 81 is more uniform than the wall thickness distribution in flexible tube 45 shown in FIG. 4B, especially as it relates to the area of restrained elongation section 85, which improves the bending capability of flexible tube 81 while concurrently adequately restraining the elongation thereof.

The length (in the radial direction), the width (in the axial direction) and the cross-sectional shape of bending sections 57, restrained elongation sections 59 and transition sections 61 of convolutes 55 may each be varied individually or together to modify the elongation and bending properties of flexible tube 51. Further, the angle of the junction of restrained elongation sections 59 and transition sections 61 may be varied, as may be the angle of the junction of bending sections 59 and transition sections 61.

Figure 7A:
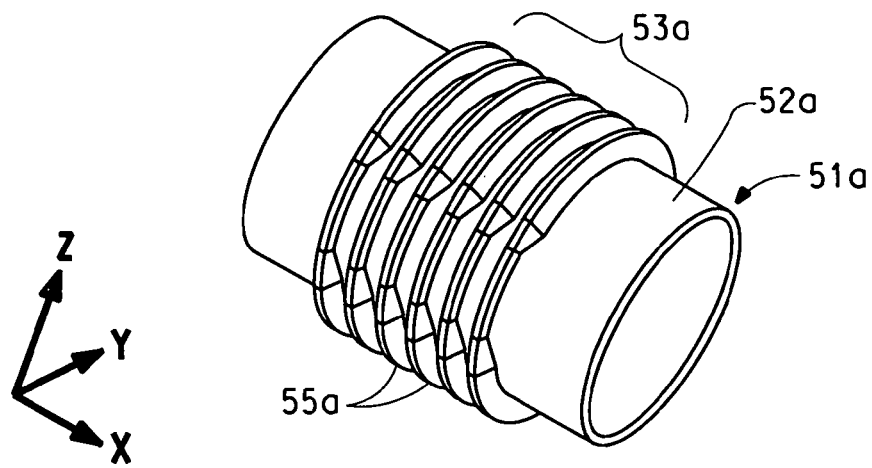
FIGS. 7A–7C are, respectively, a view in perspective, a front view in elevation and a side view in elevation of another embodiment of a flexible tube of the invention similar to that of FIGS. 5A–5C but which shows modified restrained elongation sections.
Figure 7B:
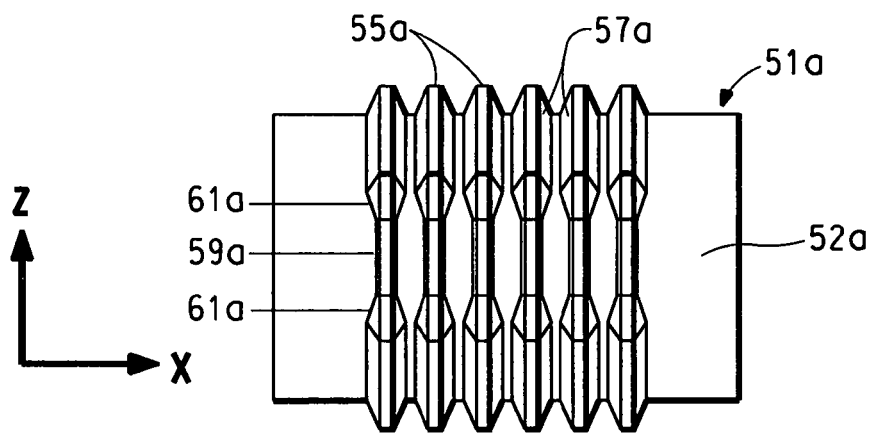
Figure 7C:
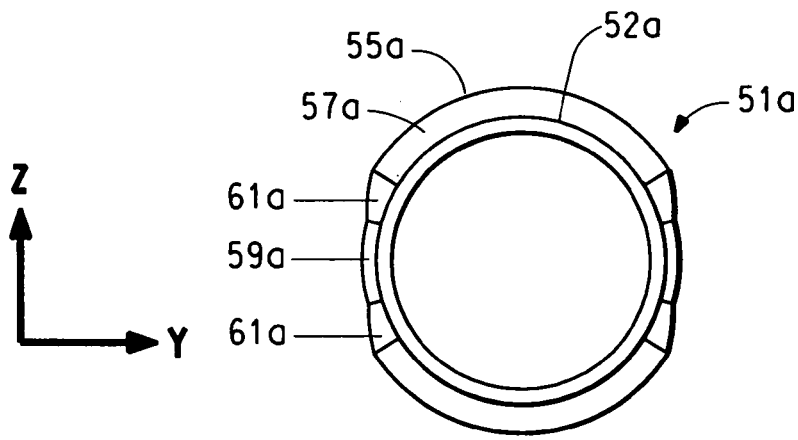
Figure 8A:
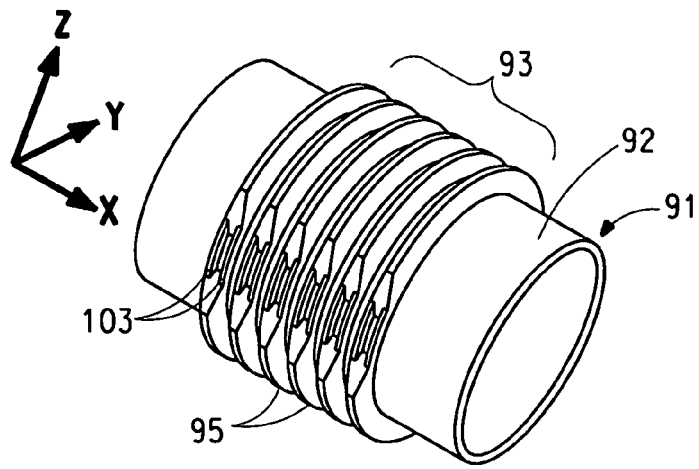
FIGS. 8A–8C are, respectively, a view in perspective, a front view in elevation, and a side view in elevation of another embodiment of a flexible tube of the invention which includes bellows having convolutes with restrained elongation sections that include additional convolutes.
Figure 8B:
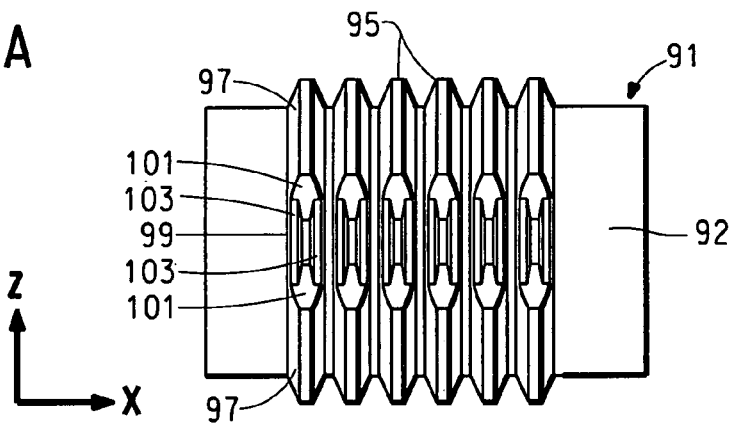
Figure 8C:
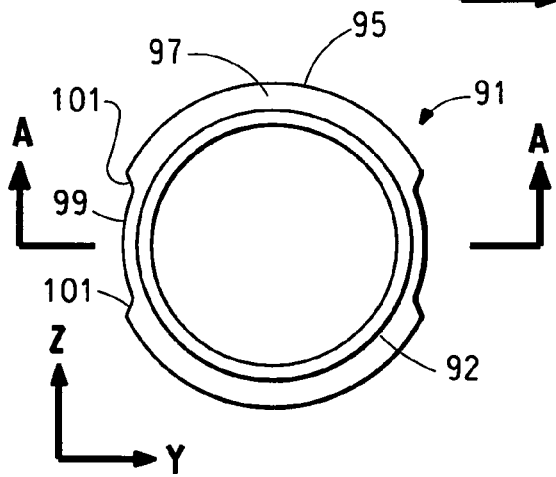
Figure 8D:
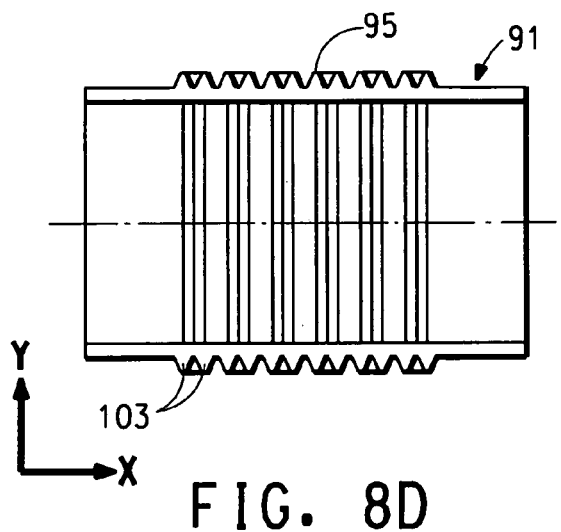
FIG. 8D is a view in cross section of the tube of FIGS. 8A–8C, taken along the lines A—A in FIG. 8C.

For example, in FIGS. 7A–7C, there is shown another embodiment of the invention which is similar to that shown in FIGS. 5A–5C, except that the shape of the convolutes has been modified. Turning to FIGS. 7A–7C, there is shown a flexible tube 61a that includes a bellows 53a having a plurality of convolutes 55a formed in tube 51a wherein the convolutes have opposing bending sections 57a, opposing restrained elongation sections 59a, and transition sections 61a that connect bending sections 57a to restrained elongation sections 59a.

In the case of flexible tube 51a, near the surface of tube 51a convolutes 55a are narrower in the area of restrained elongation sections 59a than in the area of bending sections 57a, and the width of transition sections 61a near the surface of tube 51a is tapered moving from bending sections 57a to restrained elongation sections 59a.

Another embodiment of the invention is shown in FIGS. 8A–8D, there is shown a flexible tube 91 that includes a bellows 93 having a plurality of convolutes 95 formed in tube 91 wherein the convolutes have opposing bending sections 97, opposing restrained elongation sections 99, and transition sections 101 that connect bending sections 97 to restrained elongation sections 99. In this embodiment, restrained elongation sections 99 include two radially-spaced convolutes 103 which are attached at both ends to transition sections 101. This embodiment of the invention has an improved wall thickness due to the additional contours formed on the inside of tube 91 by convolutes 103 in restrained elongation section 99.

The shape and size of convolutes 103 in restrained elongation sections 99 may be varied to modify the bending and elongation characteristics of flexible tube 91.

Figure 9A:
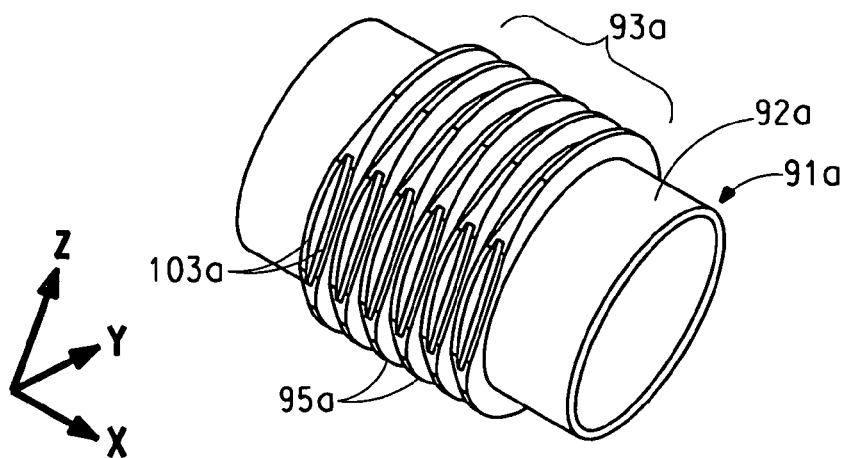
FIGS. 9A–9C are, respectively, a view in perspective, a front view in elevation and a side view in elevation of another embodiment of a flexible tube of the invention similar to that shown in FIGS. 8A–8C but with modified restrained elongation sections.
Figure 9B:
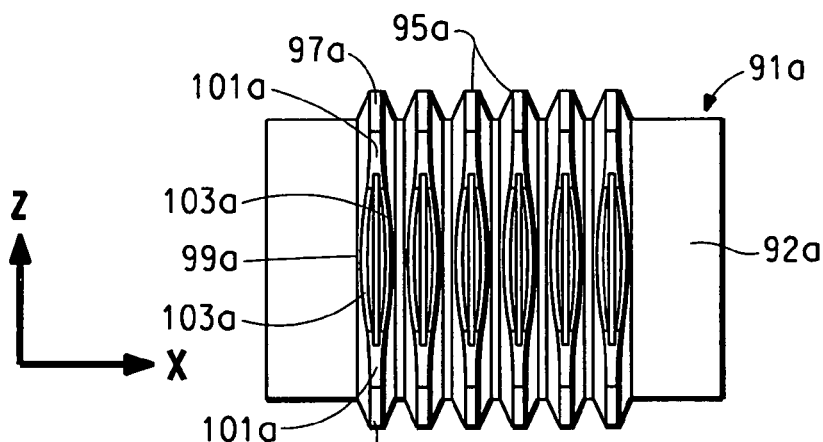
Figure 9C:
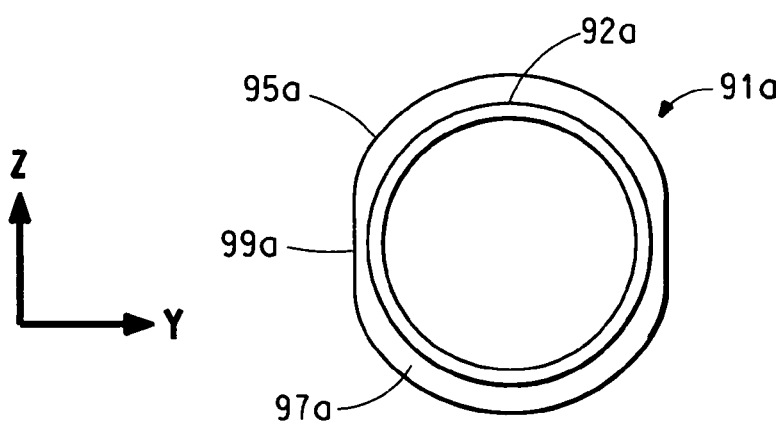

For example, in FIGS. 9A–9C there is shown a flexible tube 91a that includes a bellows 93a having a plurality of convolutes 95a formed in tube 91a having opposing bending sections 97a, opposing restrained elongation sections 99a, and transition sections 101a. Restrained elongation sections 99a include two radially-spaced convolutes 103a which are attached at both ends to transition sections 101a and which extend into transition sections 101a. Further, convolutes 103a are tapered so as to vary in width moving from the center of a restrained elongation section 99a to a transition section 101a. The modified convolutes 103a modify the bending and elongation characteristics of flexible tube 91a compared to flexible tube 91.

Figure 10A:
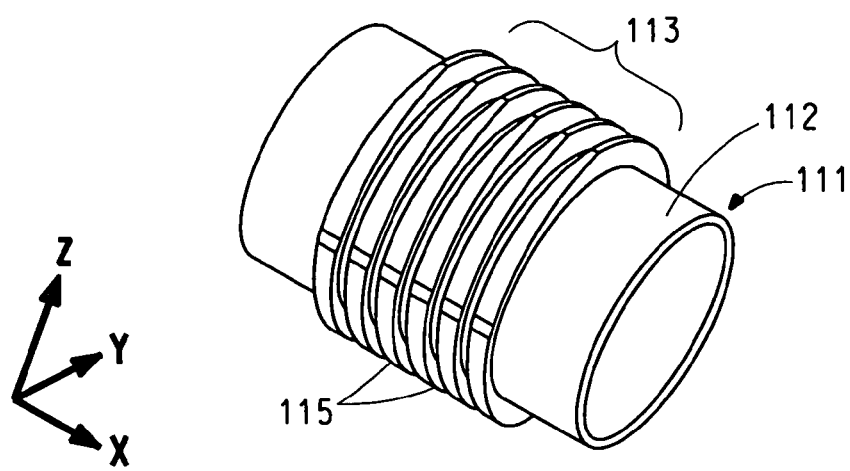
FIGS. 10A–10C are, respectively, a view in perspective, a front view in elevation and a side view in elevation of another embodiment of a flexible tube of the invention having elliptically-shaped bellows.
Figure 10B:
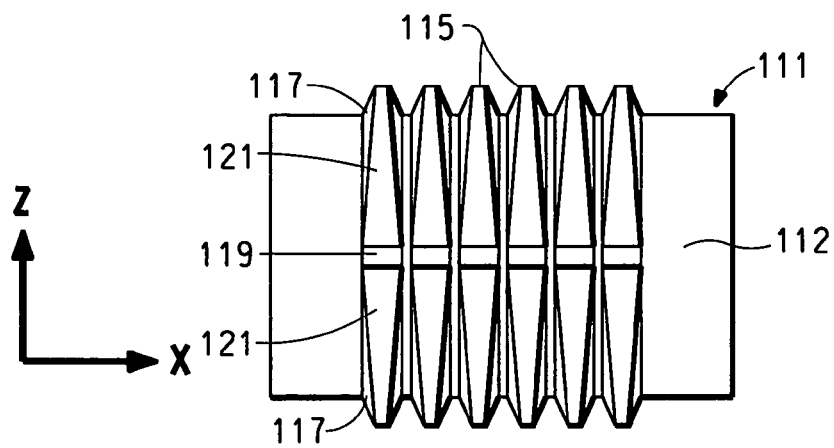
Figure 10C:
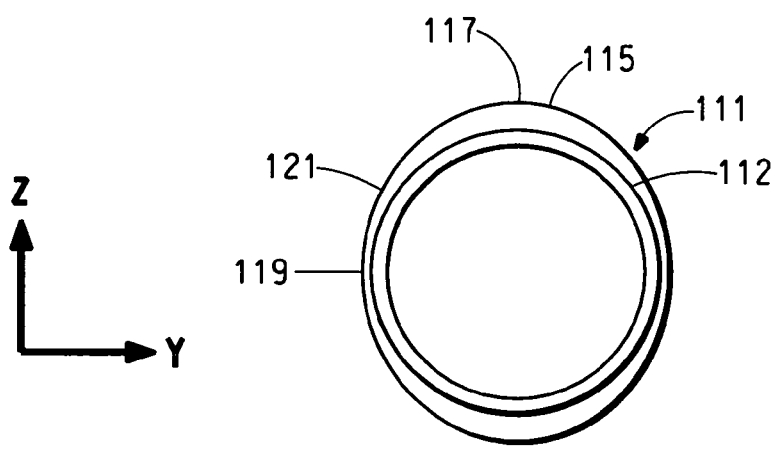
Figure 11A:
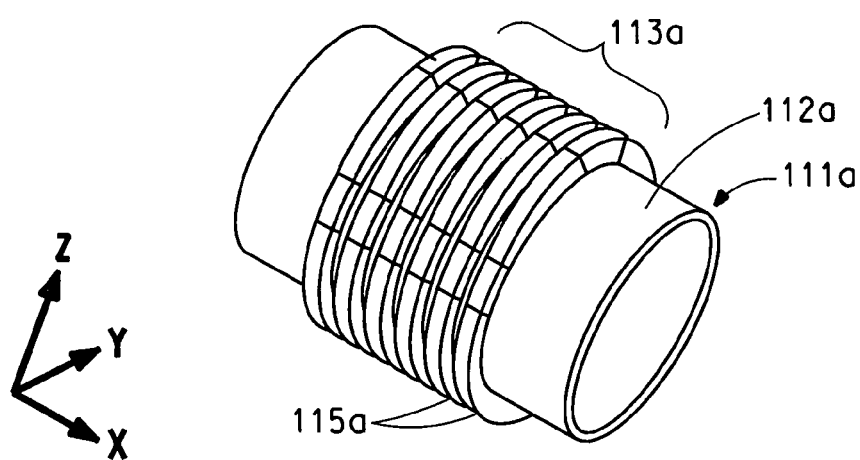
FIGS. 11A–11C are, respectively, a view in perspective, a front view in elevation and a side view in elevation of a flexible tube similar to that shown in FIGS. 10A–10C but with modified restrained elongation sections.
Figure 11B:
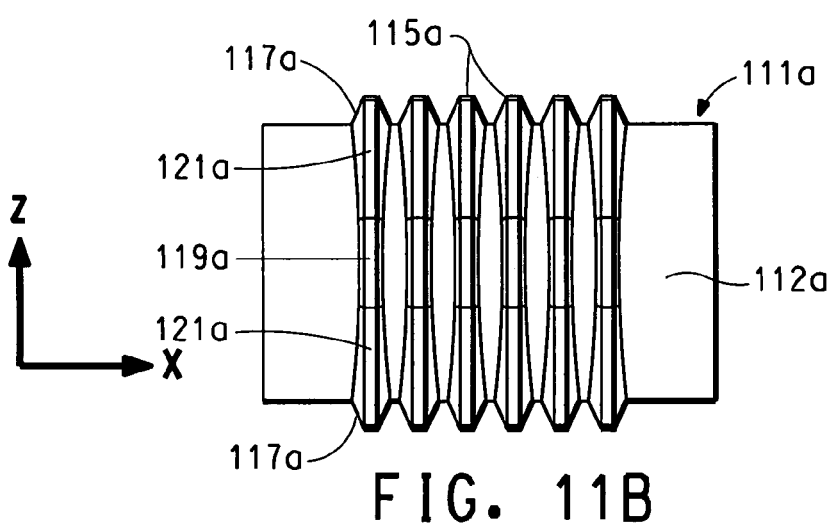
Figure 11C:
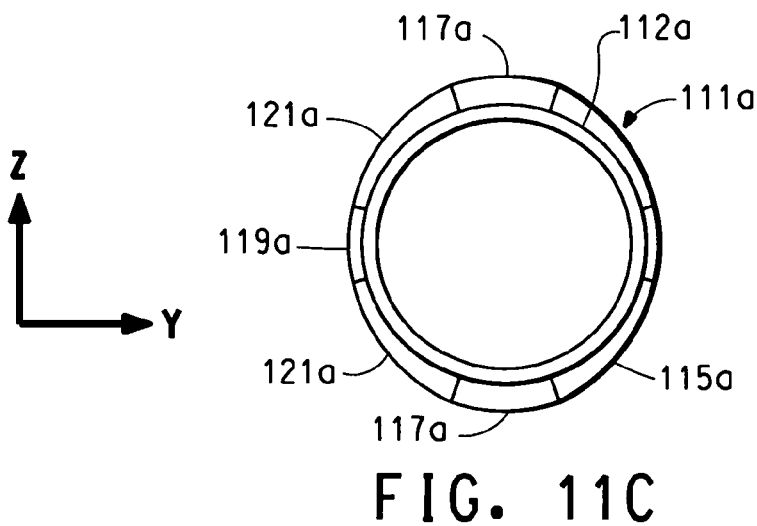

Another embodiment of the invention is shown in FIGS. 10A–10C where there is shown a flexible tube 111 that includes a bellows 113 having a plurality of convolutes 115 formed therein spaced at an interval from each other in the axial direction of flexible tube 111. Convolutes 115, which are raised circumferential ridges formed in the surface of tube 111 as an integral part thereof, have opposing bending sections 117, opposing restrained elongation sections 119, and transition sections 121 that connect bending sections 117 to restrained elongation sections 119. Convolutes 115, when viewed from the axial direction, are elliptically-shaped. Convolutes 115 are characterized in being relatively flat in restrained elongation sections 119 and having a relatively long transition section 121 that connects flat restrained elongation sections 119 to bending sections 117.

The height of convolutes 115 in bending sections 117, restrained elongation sections 119, and transition sections 121 may be varied provided that the overall shape of convolutes 115 remains elliptical. The width (in the longitudinal direction) of convolutes 115 may be varied to modify the bending and elongation characteristics of flexible tube 111.

For example, in FIGS. 1A–11C, there is shown a flexible tube 111a that includes a bellows 113a having a plurality of convolutes 115a having opposing bending sections 117a, opposing restrained elongation sections 119a, and transition sections 121a, which convolutes 115a, when viewed from the axial direction, are elliptically-shaped. Convolutes 115a are narrower in the region of restrained elongation sections 119a than in bending sections 117a, with the width of transition sections 121a being tapered from the width of bending sections 117a to restrained elongation sections 119a.

While the above embodiments of the invention have bellows wherein the shape of each of the convolutes of the bellows is the same, the flexible tubes of the present invention may include convolutes of varying shapes.

Figure 12A:
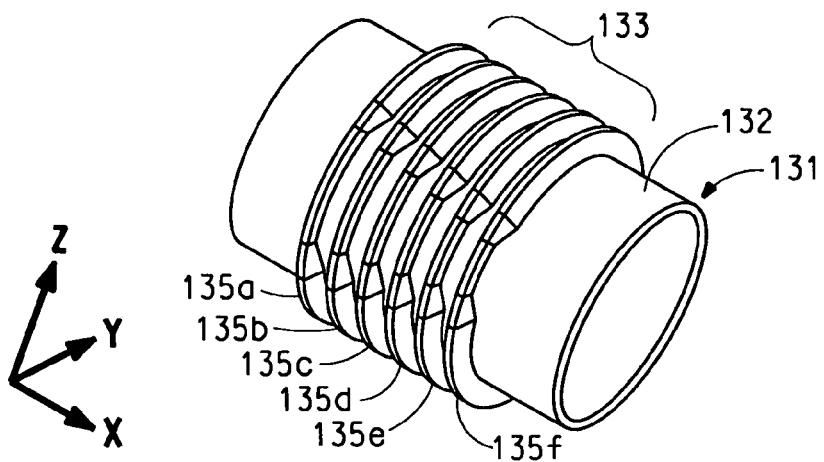
FIGS. 12A–12C are, respectively, a view in perspective, a front view in elevation and a side view in elevation of another embodiment of the flexible tube of the invention having a bellows with convolutes wherein the radial length of the restrained elongation sections is tapered.
Figure 12B:
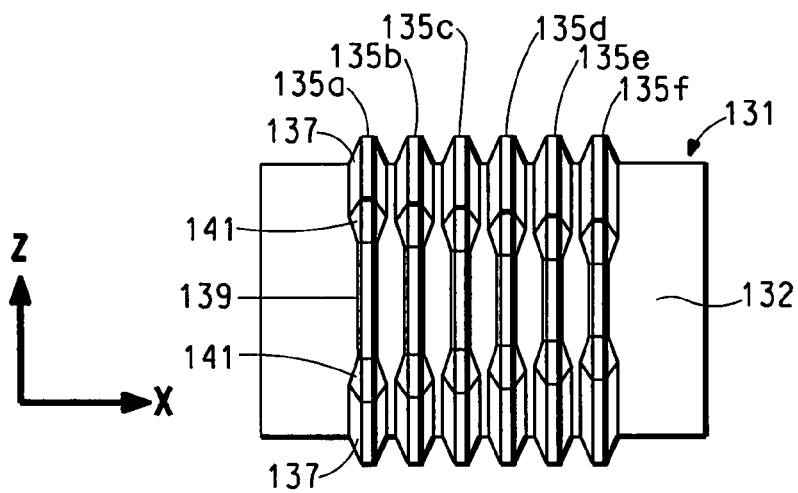
Figure 12C:
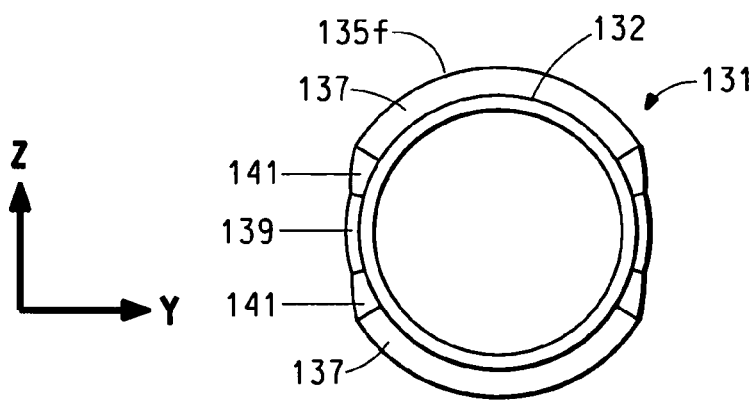

For example, turning to FIGS. 12A–12C there is shown a flexible tube 131 that includes a bellows 133 having convolutes 135a–f formed therein spaced at an interval from each other in the axial direction of flexible tube 131. Convolutes 135a–f comprise opposing bending sections 137, opposing restrained elongation sections 139, and transition sections 141 that connect bending sections 137 to restrained elongation sections 139. The length, in the radial direction, of restrained elongation sections 139 increases from convolute 135a to convolute 135f. Similarly, the length, in the radial direction, of bending sections 137 increases from convolute 135a to convolute 135f. Varying the length of restrained elongation sections 139 and bending sections 137 allow the bending and elongation characteristics of flexible tube 131 to be modified as desired.

The varying radial length of restrained elongation sections 139 of tube 131 improves the stress distribution in bending of tube 131. For example, if the end of tube 131 near convolute 135a is fixed and the other end of tube 131 is pulled in a radial direction, force and stress will be applied to convolutes 135. However, relatively more stress will be applied to convolute 135a than convolute 135f and convolutes nearer the fixed end will deform more than those close to the load side. The design of FIGS. 12A–12C distributes more evenly the bending stress over bellows 133.

While not exhibited in FIGS. 5–11, the length of the transition sections of the convolutes may be varied from convolute to convolute, and the width, in the axial direction of any or all of the bending section, transition section and/or restrained elongation section may be varied from convolute to convolute in the bellows of a flexible tube.

The majority of applications and developments in blow molded flexible tubes, coolant and fuel pipes are made around tubes, or almost circular profiles. However, there is no limitation on the cross-sectional shape of the convolutes that may be present in the flexible tubes of the present invention. The convolutes in the bending sections, transition sections and/or restrained elongation sections may be triangular, rectangular, trapezoidal or any other shape, or mixtures of such shapes, as long as such shape or shapes provide the benefits of this invention.

The bending sections of the convolutes of this invention are preferably opposite each other at an angle of 150–210°, preferably 180°. Similarly, the restrained elongation sections of the convolutes of this invention are preferably opposite each other at an angle of 150–210°, preferably 180°.

A preferred method of manufacture of the flexible tubes of this invention is blow molding, such as extrusion blow molding, co-extrusion blow molding or sequential blow molding.

The flexible tubes of the invention may be used for air-conduction parts and liquid lines in automobiles or as water lines for washing machines.

The invention claimed is:

1. A flexible tube having a bellows comprising a plurality of convolutes formed in the wall of said tube, said convolutes extending above the top surface of the tube and circumscribing the tube, said convolutes being spaced from one another in the axial direction of the tube,
wherein at least one of said convolutes comprises two opposing bending sections and two restrained elongation sections positioned between the bending sections, and
wherein the two opposing bending sections and the two restrained sections all extend a height above the top surface of the tube, the height of the bending sections above the top surface of the tube being greater than the height of the restrained elongation sections above the top surface of the tube, whereby the bending sections of the flexible tube are more flexible than the restrained sections of the flexible tube, wherein said plurality of convolutes includes two convolutes juxtaposed next to each other that each have two opposing bending sections and two opposing restrained elongation sections positioned between the bending sections, said two opposing bending sections and said two opposing restrained elongation sections of said two juxtaposed convolutes being aligned with corresponding bending sections and restrained sections of the juxtaposed convolute, and wherein the width in the axial direction of the restrained elongation section is less than the width in the axial direction of the bending section.

2. The tube of claim 1, further comprising a plurality of transition sections, said transition sections being positioned between said bending sections and said restrained elongation sections.

3. The tube of claim 1, wherein said tube comprises a thermoplastic resin.

4. An air duct that includes the tube of claim 1.

5. A coolant pipe that includes the tube of claim 1.

6. A fuel tube that includes the tube of claim 1.

7. An automobile liquid line that includes the tube of claim 1.

8. A water line that includes the tube of claim 1.

9. A flexible tube having a bellows comprising a plurality of convolutes formed in the wall of said tube, said convolutes extending above the top surface of the tube and circumscribing the tube, said convolutes being spaced from one another in the axial direction of the tube,
wherein at least one of said convolutes comprises two opposing bending sections and two restrained elongation sections positioned between the bending sections, and
wherein the two opposing bending sections and the two restrained sections all extend a height above the top surface of the tube, the height of the bending sections above the top surface of the tube being greater than the height of the restrained elongation sections above the top surface of the tube, whereby the bending sections of the flexible tube are more flexible than the restrained sections of the flexible tube,
wherein said plurality of convolutes includes two convolutes juxtaposed next to each other that each have two opposing bending sections and two opposing restrained elongation sections positioned between the bending sections, said two opposing bending sections and said two opposing restrained elongation sections of said two juxtaposed convolutes being aligned with corresponding bending sections and restrained sections of the juxtaposed convolute, wherein the restrained elongation sections include two convolutes radially spaced apart that each have opposite ends attached to one of said transition sections.

10. A flexible tube having a bellows comprising a plurality of convolutes formed in the wall of said tube, said convolutes extending above the top surface of the tube and circumscribing the tube, said convolutes being spaced from one another in the axial direction of the tube,
wherein at least one of said convolutes comprises two opposing bending sections and two restrained elongation sections positioned between the bending sections, and
wherein the two opposing bending sections and the two restrained sections all extend a height above the top surface of the tube, the height of the bending sections above the top surface of the tube being greater than the height of the restrained elongation sections above the top surface of the tube, whereby the bending sections of the flexible tube are more flexible than the restrained sections of the flexible tube, wherein said plurality of convolutes includes two convolutes juxtaposed next to each other that each have two opposing bending sections and two opposing restrained elongation sections positioned between the bending sections, said two opposing bending sections and said two opposing restrained elongation sections of said two juxtaposed convolutes being aligned with corresponding bending sections and restrained sections of the juxtaposed convolute, wherein at least two of said convolutes comprise two opposing bending sections and two restrained elongation sections positioned between the bending sections, and wherein the length in the radial direction of the elongation sections decreases from a first convolute to a second convolute.

* * * * *